US008542181B2

(12) United States Patent
Smith et al.

(10) Patent No.: US 8,542,181 B2
(45) Date of Patent: Sep. 24, 2013

(54) FLAT PANEL DISPLAY DEVICE, CONTROLLER, AND METHOD FOR DISPLAYING IMAGES

(75) Inventors: Sterling Smith, Hsin-Chu Hsien (TW); Chih-Tien Chang, Hsin-Chu Hsien (TW)

(73) Assignee: MStar Semiconductor, Inc., ChuPei, Hsin-Chu Hsien (TW)

( * ) Notice: Subject to any disclaimer, the term of this patent is extended or adjusted under 35 U.S.C. 154(b) by 922 days.

(21) Appl. No.: 11/423,149

(22) Filed: Jun. 9, 2006

(65) Prior Publication Data

US 2007/0001998 A1 Jan. 4, 2007

Related U.S. Application Data

(60) Provisional application No. 60/694,687, filed on Jun. 29, 2005, provisional application No. 60/596,141, filed on Sep. 2, 2005.

(51) Int. Cl.
*G09G 3/36* (2006.01)
*G09G 3/10* (2006.01)
*G02F 1/1335* (2006.01)

(52) U.S. Cl.
USPC ............. 345/102; 315/169.3; 349/61; 349/70

(58) Field of Classification Search
USPC .. 345/102, 94, 98, 84, 48, 52–54; 315/169.3; 349/61, 70
See application file for complete search history.

(56) References Cited

U.S. PATENT DOCUMENTS 4,541,066 A 9/1985 Lewandowski
5,334,952 A * 8/1994 Maddy et al. ................. 331/1 A
5,572,735 A 11/1996 Tanikawa
5,729,720 A * 3/1998 Kau et al. ...................... 713/500
5,757,365 A * 5/1998 Ho ............................... 345/212
5,844,540 A * 12/1998 Terasaki ........................ 345/102
6,281,700 B1 * 8/2001 Matsueda ..................... 324/770
7,081,880 B2 7/2006 Morishita
7,092,140 B2 8/2006 Pan
7,425,949 B2 9/2008 Lin
2002/0101180 A1 * 8/2002 Shino ......................... 315/169.3
2002/0125863 A1 * 9/2002 Lin et al. ........................ 323/234
2003/0178951 A1 * 9/2003 Park et al. ..................... 315/312
2004/0008176 A1 * 1/2004 Nuimura ....................... 345/102
2004/0056825 A1 * 3/2004 Min et al. ........................ 345/38
2004/0100439 A1 5/2004 Chao
2005/0083282 A1 * 4/2005 Honbo ............................ 345/87
2006/0049959 A1 * 3/2006 Sanchez ..................... 340/855.3
2006/0197735 A1 9/2006 Vuong

FOREIGN PATENT DOCUMENTS

CN 2443552 Y 8/2001
CN 1499248 A 5/2004
CN 1573460 A 2/2005
JP 7-325286 12/1995
TW 523706 3/2003
WO WO 2004/072733 A2 * 8/2004

* cited by examiner

*Primary Examiner* — Jonathan Horner

(74) *Attorney, Agent, or Firm* — Winston Hsu; Scott Margo

(57) ABSTRACT

A flat panel display device, LCD controller and associated method is provided. The flat panel display device includes a display panel, a lamp for providing a backlight source for the display panel, a power transformation module for providing a power source for the lamp, a non-volatile storage unit for storing program code, and a display controller. The display controller includes an image processing module for processing image data and outputting processed results to the display panel, and a digital pulse width modulation module for adjusting on and off time of the power transformation module according to a synchronization signal.

32 Claims, 15 Drawing Sheets

FLAT PANEL DISPLAY DEVICE, CONTROLLER, AND METHOD FOR DISPLAYING IMAGES

CROSS REFERENCE TO RELATED APPLICATIONS

This application claims the benefit of U.S. Provisional Application No. 60/694,687 and 60/596,141, filed Jun. 29, 2005 and Sep. 2, 2005 respectively, and included herein by reference.

BACKGROUND OF THE INVENTION

1. Field of the Invention

The present invention relates to a flat panel display device, controller, and method for displaying images, and more particularly, to a flat panel display device, controller, and method for enhancing display quality by associating a frequency of a lamp with a display frequency.

2. Description of the Prior Art

Liquid crystal display (LCD) monitors can be classified into reflective, transmissive, and transflective LCD monitors. A reflective LCD monitor displays images with an external light source, which penetrates a display panel and is reflected by an internal reflector therein. A transmissive LCD monitor comprises a backlight source behind liquid crystal units, which emits light and penetrates liquid crystal units. A transflective LCD monitor is a combination of the reflective LCD monitor and the transmissive LCD monitor.

In the transmissive LCD monitor, one or multiple cold cathode fluorescent lamps (CCFLs) are used as backlight sources. To emit light, the CCFL is driven by a high voltage source. Then, the CCFL excites mercury vapor therein to a high energy level by discharging the electricity. The excited mercury vapor returns to its initial energy state while the extra energy becomes ultraviolet. Finally, a phosphorescence material, spread on the inner surface of the CCFL, transforms ultraviolet into visible light.

FIG. 1 illustrates a block diagram of a prior art transmissive LCD monitor 100. The LCD monitor 100 includes an image processing circuit 102, a display panel 104, and a backlight module 106. The image processing circuit 102 controls R, G, and B (red, green, and blue) components for each pixel on the display panel 104 to display different color and contrast. The backlight module 106 includes a pulse width modulation (PWM) module 108, a voltage transformation circuit 110, a power source module 112, and a CCFL 114 to provide a light source for displaying images. To drive the CCFL 114, the voltage transformation circuit 110 transforms low-voltage DC power provided by the power source module 112 into high-voltage AC power with high-frequency. The PWM module 108 controls the AC power provided by the voltage transformation circuit 110 to adjust luminance of the CCFL 114. The PWM module 108 controls luminance of the CCFL 114 by adjusting on and off time of the CCFL 114 periodically. Therefore, the PWM module 108 provides a wider dimming range.

Conventionally, the image processing circuit 102 generates control signals through digital signal processing procedures, while the PWM module 108 is implemented by additional analog circuits, so that the image processing circuit 102 and the PWM module 108, causing ripples on the display panel 104, and decreasing quality.

SUMMARY OF THE INVENTION

It is therefore a primary objective of the claimed invention to provide a flat panel display device, controller, and method for displaying images.

The present invention discloses a flat panel display device, which comprises a display panel, a lamp for providing a backlight source for the display panel, a power transformation module for providing a power source for the lamp, a non-volatile storage unit for storing program code, and a display controller. The display controller comprises an image processing module for processing image data and outputting processed results to the display panel, and a digital pulse width modulation module for adjusting on and off time of the power transformation module according to a horizontal synchronization signal.

The present invention further discloses a display controller, comprising an image processing module for processing image data, and a digital pulse width modulation module coupled to the image processing module and an external application circuit, for generating a set of control signals for controlling the external application circuit according to a horizontal synchronization signal, wherein the control signals further associate with a vertical synchronization signal.

The present invention further discloses a method for controlling a backlight driving circuit. The display controller receives a video source signal, generates a set of parameters corresponding to a display mode by the display controller, and generates a set of control signals associated with a horizontal synchronization signal for the driving circuit by the display controller according to the set of the parameters.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
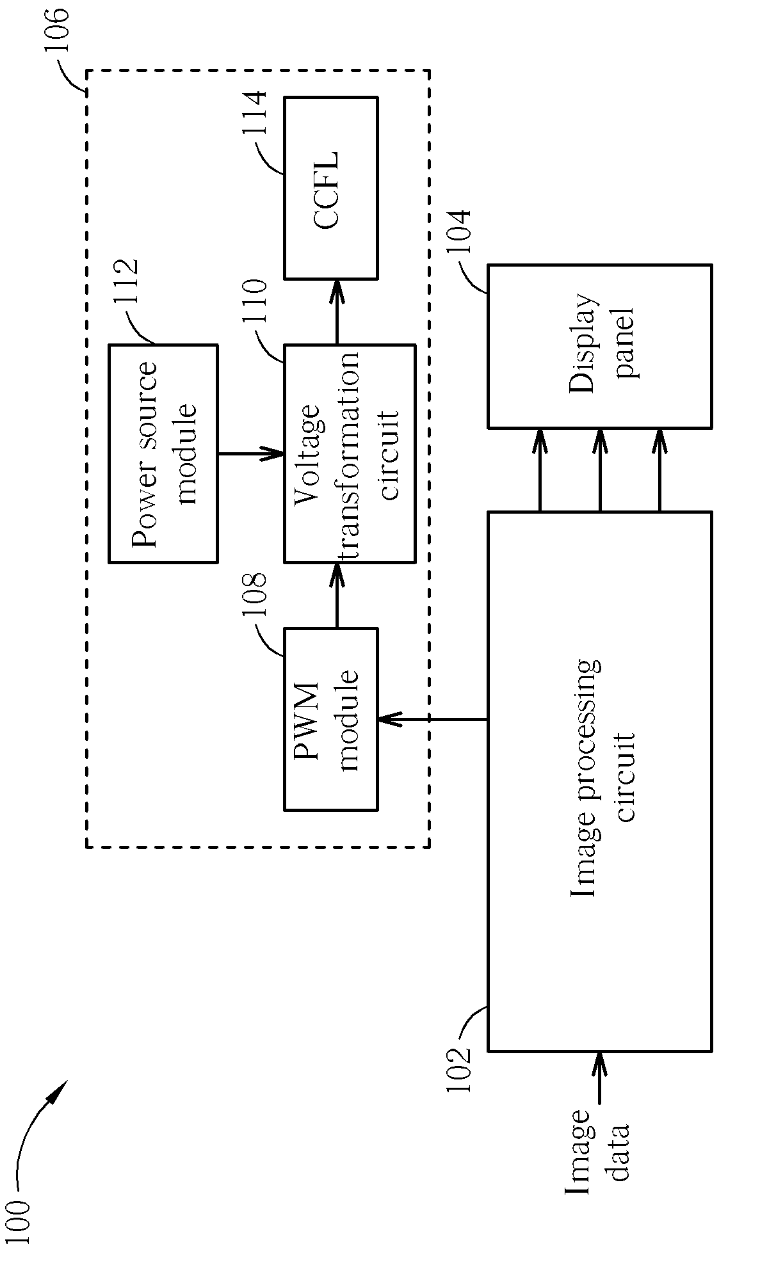
Fig. 1 Prior art
FIG. 1 illustrates a block diagram of a prior art transmissive LCD monitor.
Figure 2:
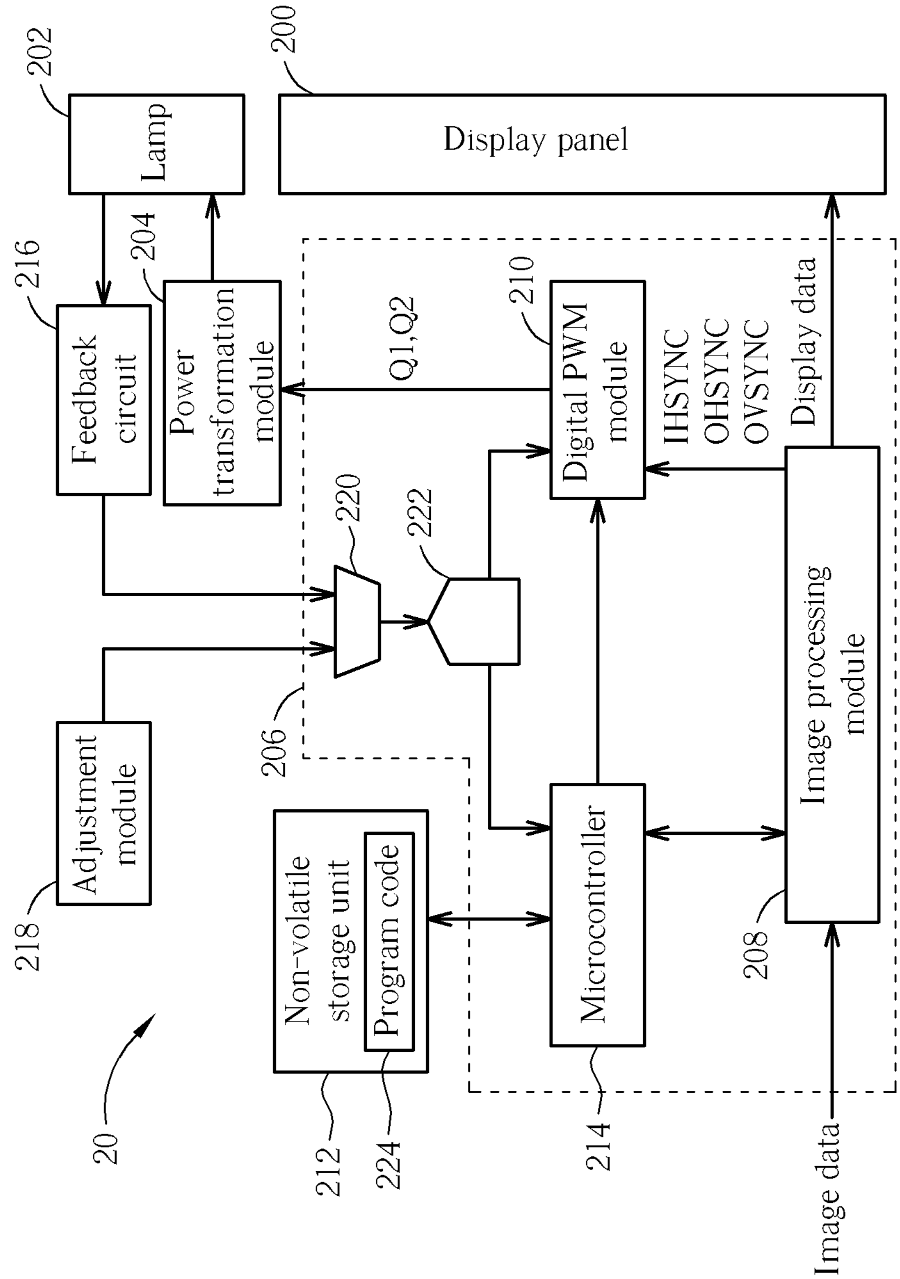
FIG. 2 illustrates a block diagram of a flat panel display device according to a preferred embodiment of the present invention.

Please refer to FIG. 2, which illustrates a block diagram of a flat panel display device 20 in accordance with a preferred embodiment of the present invention. The flat panel display device 20 includes a display panel 200, a lamp 202, a power transformation module 204, a non-volatile storage unit 212, and a display controller 206. The display controller 206 includes an image processing module 208, a digital PWM module 210, and a microcontroller 214. The flat panel display device 20 preferably includes a feedback circuit 216, an adjustment module 218, a multiplexer 220, and an A/D converter 222. The microcontroller 214 performs program code 224 stored in the non-volatile storage unit 212 to coordinate operations of the display controller 206, to control the display panel 200 and the lamp 202. In the display controller 206, the image processing module 208 receives a video source including an input horizontal synchronization signal IHSYNC, generates an output horizontal synchronization signal OHSYNC, an output vertical synchronization signal OVSYNC, and display data for the display panel 200. The image processing module 208 preferably transmits the input horizontal synchronization signal IHSYNC, the output horizontal synchronization signal OHSYNC, and the output vertical synchronization signal OVSYNC to the digital PWM module 210. The display data includes red, blue, and green signals R, G, and B. According to the input horizontal synchronization signal IHSYNC, the output horizontal synchronization signal OHSYNC, and the output vertical synchronization signal OVSYNC, the digital PWM module 210 controlled by the microcontroller 214 generates control signals Q1 and Q2, so as to control transistors of the power transformation module 204. In this embodiment, according to different operation modes, the digital PWM module 210 can adjust ON time of the transistors in the power transformation module 204 with the control signals Q1 and Q2, so as to control luminance of the lamp 202, while the digital PWM module 210 adjusts luminance of the lamp 202 according to signals outputted from the feedback circuit 216 and the adjustment module 218. Furthermore, the power transformation module 204 can further generate a plurality of DC voltages for different applications. Notice that, according to the present invention, those skilled in the art can recognize that the power transformation module 204 can be an inverter to control the lamp 202 or a voltage regulator to provide a plurality of voltage sources. The adjustment module 218 and the feedback circuit 216 can share the A/D converter 222 due to low-speed operation, and saves logic gates. Alternatively, two independent A/D converters can be also implemented for converting signals from the adjustment module 218 and the feedback circuit 216 respectively. Moreover, the non-volatile storage unit 212 can be various kind of non-volatile memory, such as flash memory, EEPROM, etc., and the non-volatile storage unit 212 can be outside the display controller 206 or integrated in the display controller 206. Similarly, the microcontroller 214, such as 8051 microcontroller, can be outside the display controller 206 or integrated in the display controller 206. Furthermore, the power transformation module 204 can be utilized for driving not only a CCFL, but also other backlight sources, such as LEDs.

Figure 3:
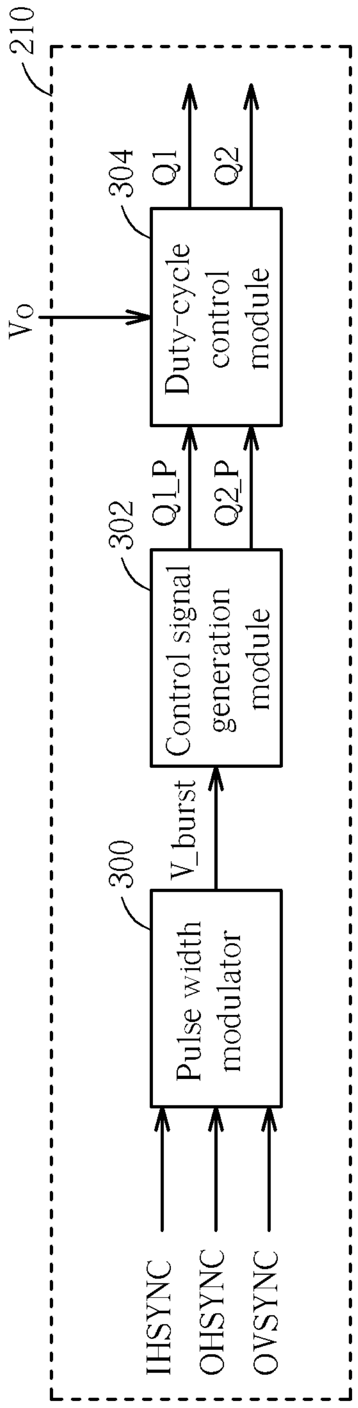
FIG. 3 illustrates a block diagram of the digital PWM module shown in FIG. 2 according to a preferred embodiment of the present invention.

FIG. 3 illustrates a block diagram of a preferred embodiment of the digital PWM module 210 shown in FIG. 2. The digital PWM module 210 preferably includes a pulse width modulator 300, a control signal generation module 302, and a duty-cycle control module 304. According to the input horizontal synchronization signal IHSYNC, the output horizontal synchronization signal OHSYNC, and the output vertical synchronization signal OVSYNC, the pulse width modulator 300 generates a pulse signal V_burst to the control signal generation module 302, and the microcontroller 214 controls a frequency of the pulse signal V_burst. In this embodiment, the control signal generation module 302 toggles control signals Q1_P and Q2_P at high state of the pulse signal V_burst. The duty-cycle control module 304 adjusts duty cycles of the control signals Q1_P and Q2_P to prevent overlapping of assertions between the control signals Q1_P and Q2_P. If the assertions of Q1 and Q2 are overlapped and received by the power transformation module 204, the power transformation module 204 will keep providing power for the lamp 202, which may burn out the power transformation module 204, such as an inverter circuitry. Through the duty-cycle control module 304, the assertions of Q1_P and Q2_P are prevented from overlapping, so are the control signals Q1 and Q2 received by the power transformation module 204. Preferably, the duty-cycle control module 304 adjusts the duty cycles of the control signals Q1 and Q2 according to an output voltage Vo.

Figure 4:
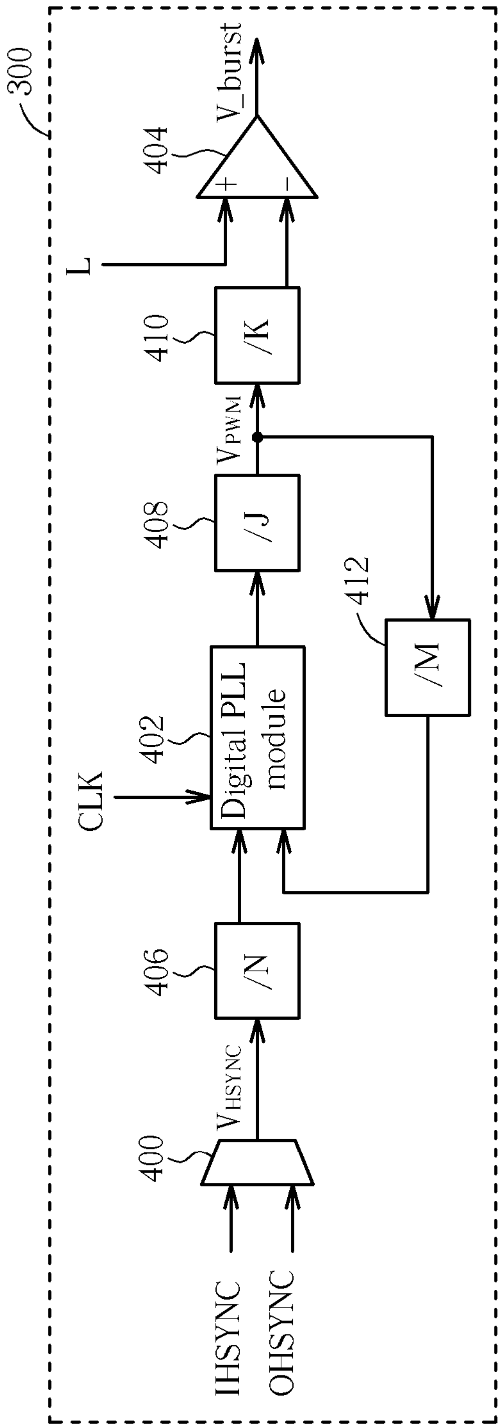
FIG. 4 illustrates a block diagram of the pulse width modulator shown in FIG. 3 according to a preferred embodiment of the present invention.

FIG. 4 illustrates a block diagram of a preferred embodiment of the pulse width modulator 300 shown in FIG. 3. The pulse width modulator 300 includes a multiplexer 400, a digital PLL module 402, a comparator 404, and dividers 406, 408, 410, and 412. The multiplexer 400 is controlled by the microcontroller 214, and utilized for outputting a signal $V_{HSYNC}$ to the divider 406 according to the input horizontal synchronization signal IHSYNC or the output horizontal synchronization signal OHSYNC. The dividers 406, 408, 410, and 412 divide received signals by divisors N, J, K, and M. The digital PLL module 402 receives a clock signal CLK, and adjusts a frequency of signals outputted to the divider 408 according to signals outputted from the dividers 406 and 412. In this embodiment, the divisors N, J, K, and M are determined by the microcontroller 214, obtained by inquiring a look-up table, and associated with the horizontal and vertical synchronization signals received by the multiplexer 400. Suppose that a frequency of the signal $V_{HSYNC}$ outputted from the multiplexer 400 is $f_{HSYNC}$, and a frequency of a signal $V_{PWM}$ outputted from the divider 408 is $f_{PWM}$, then a frequency of a signal inputted to the digital PLL module 402 is $(f_{HSYNC}\times(M/N)\times J)$. After being synchronized by the digital PLL module 402, $f_{PWM}=f_{HSYNC}\times(M/N)$, and a frequency of the pulse signal V_burst is $f_{burst}=f_{PWM}/K$. Furthermore, the frequency $f_{burst}$ of the pulse signal V_burst can be synchronized with the frequency $f_{VSYNC}$ of the vertical synchronization signal $V_{SYNC}$. For example, set $(f_{HSYNC}\times M/N/K)$ is an integral multiple of the frequency $f_{VSYNC}$, eg. 3 or 4 times, then the frequency of the signal outputted from the power transformation module 204 is associated with the frequencies of the vertical and horizontal synchronization signals, so as to prevent visible signal interference, such as ripples on the display panel 200. The comparator 404 determines the duty cycle of the pulse signal V_burst according to the signal L outputted from the microcontroller 214.

Figure 5:
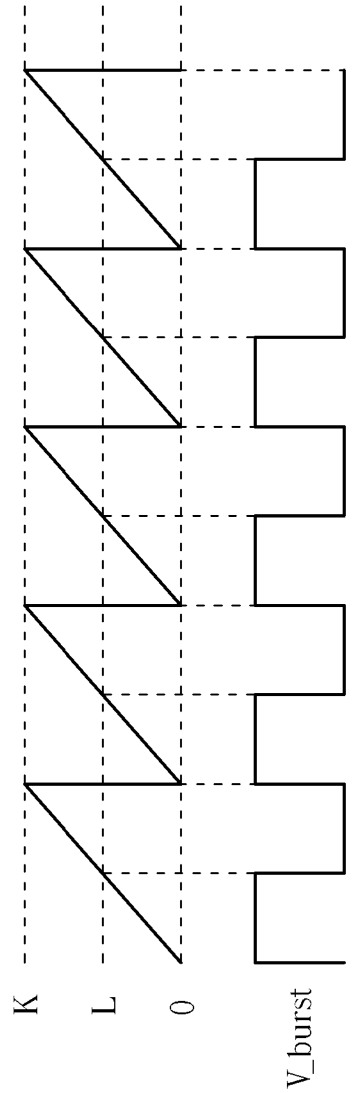
FIG. 5 illustrates a waveform diagram of signal waves corresponding to the pulse width modulator shown in FIG. 4.

Please refer to FIG. 5, which illustrates a waveform diagram of signals associated with the pulse width modulator 300 shown in FIG. 4. As shown in FIG. 5, the divisor K determines the frequency of the pulse signal V_burst. The greater the divisor K, the longer the period of the pulse signal V_burst is. The parameter L determines a duty cycle of the pulse signal V_burst. The smaller the parameter L, the shorter the positive duration of each square wave of the pulse signal V_burst is. Therefore, by adjusting the divisor K and the parameter L, the frequencies and the duty cycles of the control signals Q1 and Q2 outputted to the power transformation module 204 are controlled, and thus luminance of the lamp can be adjusted.

Figure 6:
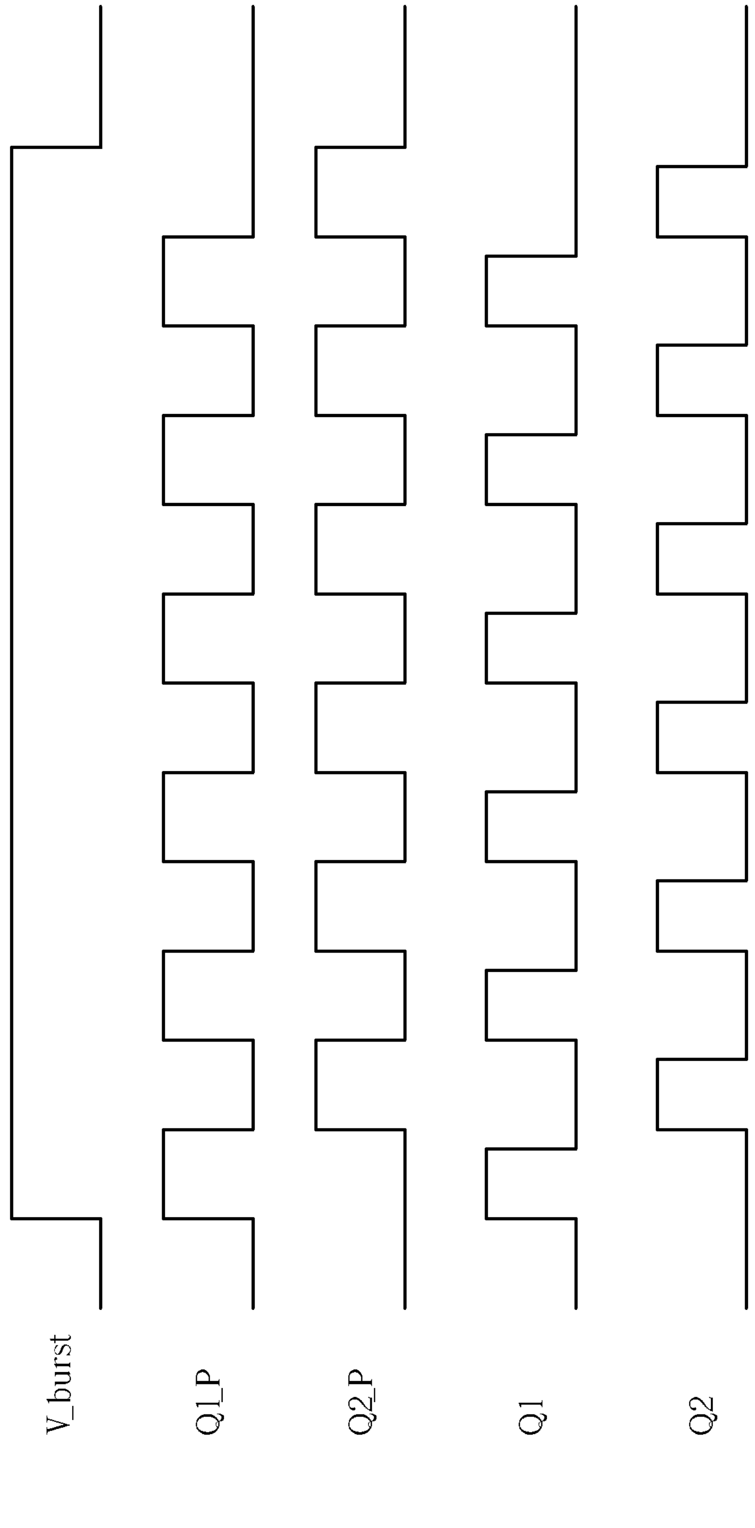
FIG. 6 illustrates a waveform diagram of signals associated with the digital PWM module shown in FIG. 3.

Refer to FIG. 3 again, the control signal generation module 302 generates the square-wave signals Q1_P and Q2_P during positive square waves of the pulse signal V_burst, and the duty-cycle control module 304 can adjust the duty cycles of the square-wave signals Q1_P and Q2_P, so as to prevent the lamp 202 from burning out due to overlapping between the square-wave signals Q1_P and Q2_P. Please refer to FIG. 6, which illustrates a waveform diagram of signals associated with the digital PWM module 210 shown in FIG. 3. The control signal generation module 302 toggles the square-wave signals Q1_P and Q2_P during positive square waves of the pulse signal V_burst, and the duty-cycle control module 304 can adjust the duty cycles of the square-wave signals Q1_P and Q2_P. Preferably, the duty cycles of the square-wave signals Q1_P and Q2_P are 45%, and assertion durations of the control signals Q1 and Q2 are separated without overlapping.

Figure 7:
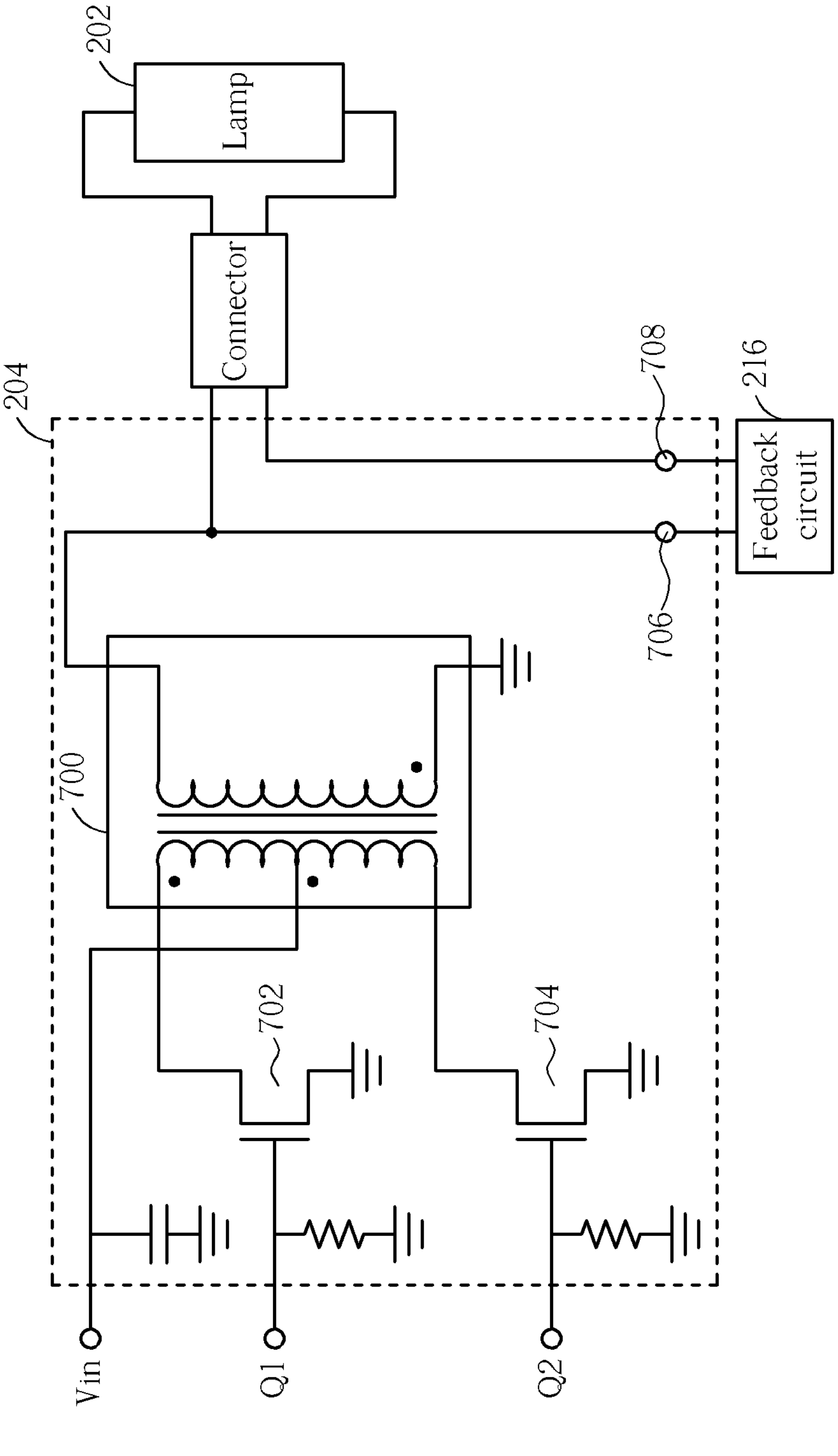
FIG. 7 illustrates a schematic diagram of the power transformation module shown in FIG. 2.

Please refer to FIG. 7, which illustrates a schematic diagram of the power transformation module 204 shown in FIG. 2. According to the control signals Q1 and Q2 provided by the digital PWM module 210, the power transformation module 204 switches the transistors 702 and 704 to control a primary end of a transformer 700 and adjust luminance of the lamp 202 coupled to a secondary end of the transformer 700. As shown in FIG. 3, when the pulse signal V_burst outputted from the pulse width modulator 300 is high, the control signal generation module 302 toggles the control signals. As mentioned above, the frequency of the pulse signal V_burst is determined by the divisors N, J, K, and M, and the duty cycle of the pulse signal V_burst is determined by the parameter L. Therefore, by adjusting N, J, K, M, and L, the frequencies and periods of the control signals Q1 and Q2 can be adjusted. For example, increasing a value of the parameter L can increase on time of the transformer 700 shown in FIG. 7, so that lighting period of the lamp 202 increases, and thus brightness of the lamp 202 is increased. Preferably, values of N, J, K, M, and L corresponding to different brightness can be stored in the non-volatile storage unit 212, and the microcontroller 214 can obtain the values of N, J, K, M, and L corresponding to a required brightness when adjusting brightness of the lamp 202. Preferably, the secondary end of the transformer 700 and the lamp 202 provide feedback signals to the display controller 206 from the feedback circuit 216 through the terminals 706 and 708.

Figure 8:
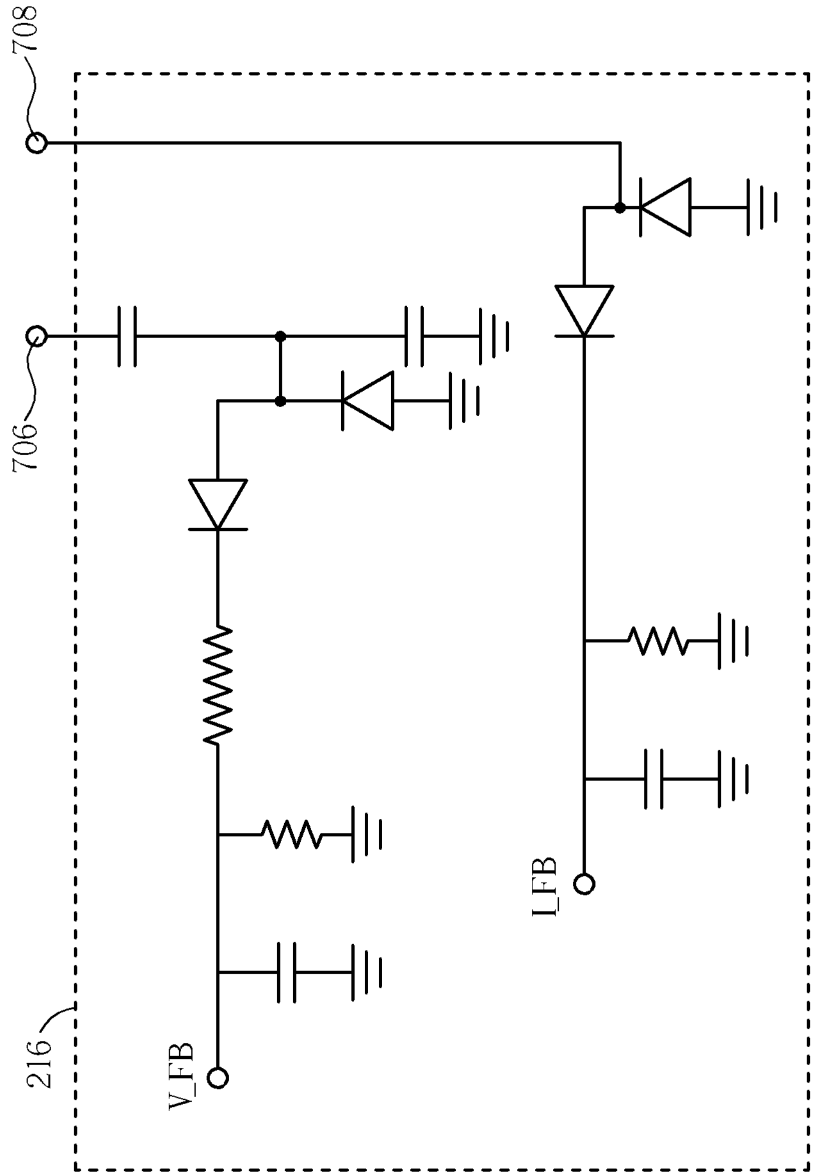
FIG. 8 illustrates a schematic diagram of a feedback circuit.

FIG. 8 illustrates a schematic diagram of the feedback circuit 216. The feedback circuit 216 can generate a feedback voltage V_FB and a feedback current I_FB according to signals outputted from the secondary end of the transformer 700 and the lamp 202. Moreover, the feedback circuit 216 can feedback an input voltage Vin provided to the power transformation module 204 and an open-lamp protection signal OLPZ (not shown in FIG. 8) to the display controller 206, which is useful for portable or multi-lamp applications.

Figure 9:
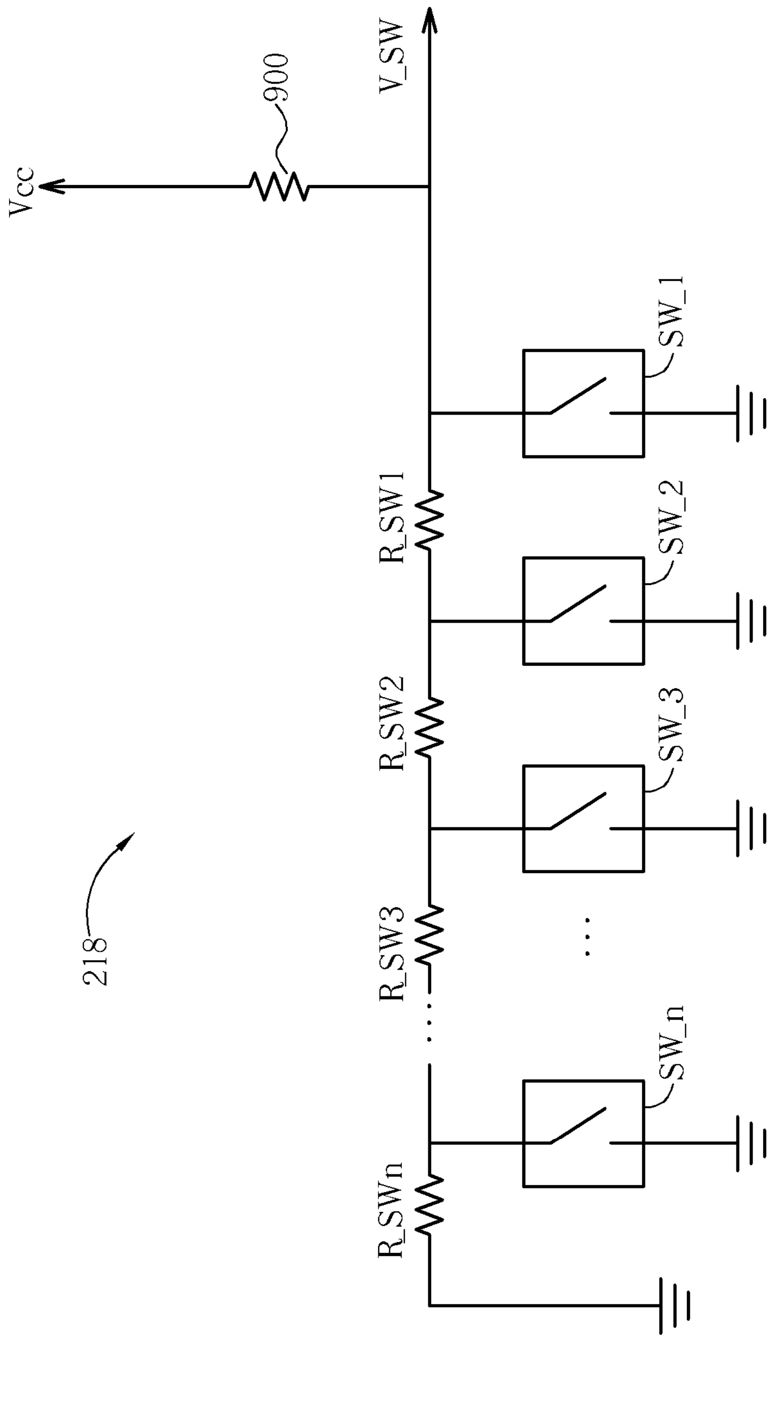
FIG. 9 illustrates a schematic diagram of an adjustment module.

FIG. 9 illustrates a schematic diagram of the adjustment module 218 shown in FIG. 2, including a resistor 900, switches SW_1 to SW_n, and resistors R_SW1 to R_SWn. The switches SW_1 to SW_n are turned off initially, and corresponding to specific items respectively, such as menu, volume up, volume down, etc. If one of the switches SW_1 to SW_n is turned on, resistance from a system voltage source Vcc to a system ground is changed, and a voltage V_SW outputted to the display controller 206 is changed accordingly. Therefore, according to the voltage V_SW, the microcontroller 214 can adjust an operating status of the display controller 206, such as brightness of the lamp 202, contrast of the display panel 200, etc.

In this embodiment, the digital PWM module 210 adjusts brightness of the lamp 202 according to the vertical and horizontal synchronization signals. Therefore, luminance frequency of the lamp 202 associates with display frequency of the display panel 200, and thus display quality can be improved. Take XGA for example, suppose that the display frequency of the flat panel display device 20 is 60 HZ, each frame includes 1344 horizontal lines and 804 vertical lines ($V_{TOTAL}$=804), then the vertical synchronization signal and the pulse signal V_burst is synchronized as follows:

$$f_{VSYNC}=60 \text{ and } V_{TOTAL}=804$$

then $$f_{HSYNC}=f_{VSYNC}*V_{TOTAL}=60\times804=48240$$

$$f_{PWM}=(M/N)\times60\times804$$

$$\text{set } f_{burst}=4\times f_{VSYNC}=240$$

$$\text{then } (M/N)\times(1/K)=4/V_{TOTAL}=4/804$$

choose $$M=1, N=1, K=201$$

Therefore, $f_{burst}$=240 HZ, and $f_{PWM}$=48.24 KHZ. Similarly, for SXGA, suppose that the display frequency of the flat panel display device 20 is 60 HZ, each frame includes 1688 horizontal lines and 1056 vertical lines ($V_{TOTAL}$=1056), then:

$$f_{VSYNC}=60 \text{ and } V_{TOTAL}=1056$$

then $$f_{HSYNC}=60\times1056=63360$$

$$f_{PWM}=(M/N)\times60\times804$$

$$\text{set } f_{burst}=4\times f_{VSYNC}=240$$

$$\text{then } (M/N)\times(1/K)=4/V_{TOTAL}=4/1056$$

choose $$M=5, N=6, K=220$$

Therefore, $f_{burst}$=240 HZ, and $f_{PWM}$=52.8 KHZ. Then, according to the values of M, N, and K corresponding to the display qualities (ex. XGA and SXGA) stored in the non-volatile storage unit 212, the microcontroller 214 can synchronize the luminance frequency of the lamp 202 and the display frequency of the display panel 200. Moreover, increasing or decreasing brightness of the lamp 202 can be achieved by adjusting the value of the parameter L for changing the operation cycles of the control signals Q1 and Q2.

In other words, the operation cycles of the control signals Q1 and Q2 associate with the frequency $f_{HSYNC}$ of the horizontal synchronization signal HSYNC and the $f_{VSYNC}$ of the vertical synchronization signal VSYNC, and thus an ignition frequency (or starting frequency) of the lamp 202 associates with the frequencies $f_{HSYNC}$ and $f_{VSYNC}$. Therefore, ripples caused by non-synchronization between the display frequency and the ignition frequency of the lamp 202 can be relieved.

Figure 10:
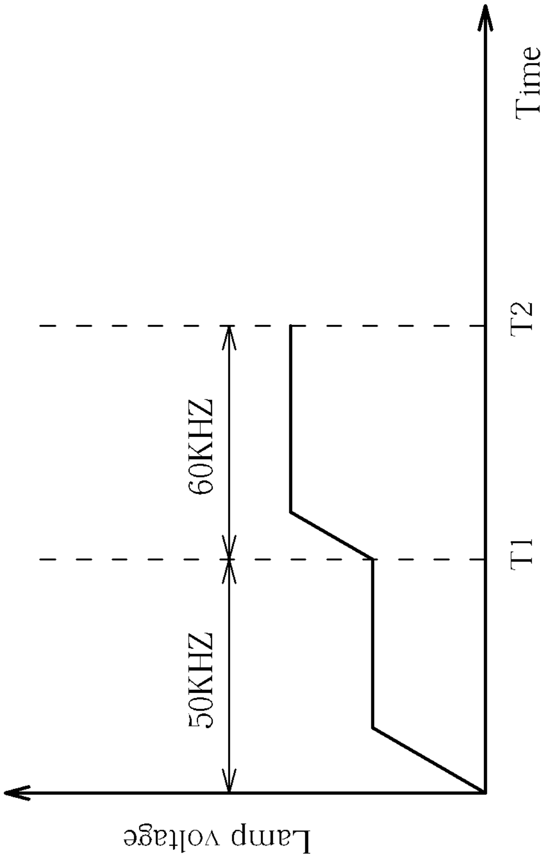
FIG. 10 illustrates a schematic diagram of operating frequency changes of the flat panel display device shown in FIG. 2 when operating in a voltage mode.
Figure 11:
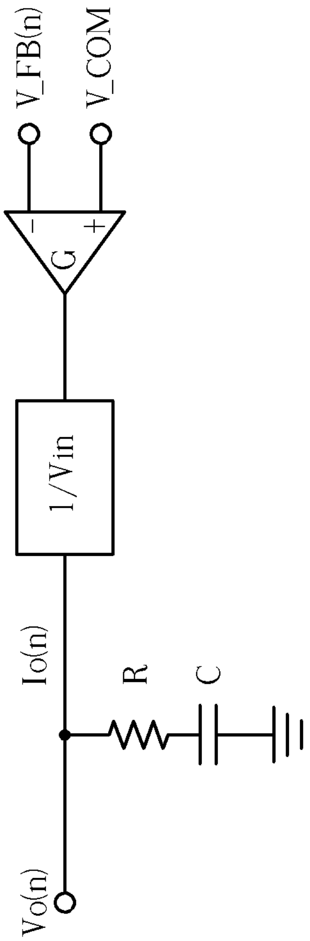
FIG. 11 illustrates an equivalent circuit diagram in the flat panel display device at an ignition stage.

Preferably, the flat panel display device 20 can operate in a plurality of operation modes, and associated operation program code 224 is designed and stored in the non-volatile storage unit 212 in advance. Please refer to FIG. 10, at an ignition stage, the flat panel display device 20 operates in a voltage mode, and operating frequencies are 50 KHZ from time points 0 to T1 and 60 KHZ from time points T1 to T2. Please refer to FIG. 11, which illustrates an equivalent circuit diagram of the program code 224 at the ignition stage. Notice that, elements of the circuit shown in FIG. 11 are utilized for narrating the operation of the program code 224, but are not required physically. An algorithm of the voltage mode is concluded as follows, where V_FB(n), Vin(n) are results of the voltages V_FB and Vin after being converted by the A/D converter 222, and T represents sampling time:

$$Io(n)=(V\_COM-V\_FB(n))\times G/Vin(n)$$

$$Vo(n+1)=Io(n)\times R+Vc(n)+Io(n)\times T/C$$

Wherein Vc(0)=0 begins soft start.

Being divided by Vin(n) is to compensate variation of the input voltage Vin. After the open-lamp protection signal OLPZ stays in a high level for a predetermined duration, the program code 224 can then entering a current mode. Please refer to FIG. 12, which illustrates an equivalent circuit diagram of the program code 224 at the current mode. An algorithm of the current mode is as follows:

$$Io(n)=(I\_COM-IFB(n))\times G/Vin(n)$$

$$Vo(n+1)=Io(n)\times R+Vc(n)+Io(n)\times T/C$$

When Vc(0)=0, soft start.

Figure 12:
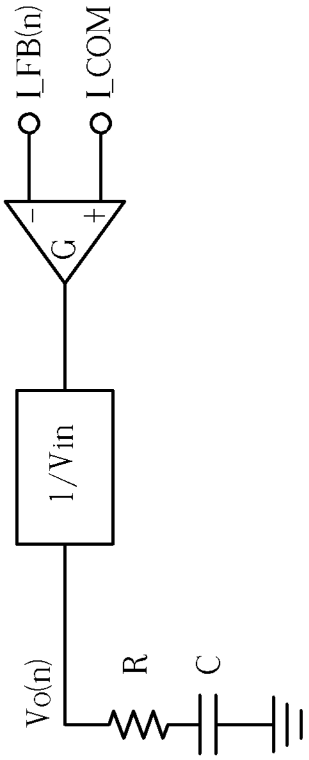
FIG. 12 illustrates an equivalent circuit diagram in the flat panel display device at a current mode.

In FIGS. 11 and 12, the blocks of 1/Vin(n) compensate variation of the input voltage Vin, especially for flat panel display devices having unstable input voltages, such as portable or vehicle flat panel display devices. Of course, for flat panel display devices having stable input voltages, the block of 1/Vin(n) is unnecessary. Note that, the circuits shown in FIGS. 11 and 12 are equivalent circuits of the program code 224, but are not required physically, so that the present invention can realize any desired performance of the flat panel display device 20 by flexibly adjusting resistors and capacitors in the equivalent circuits.

In the current mode, the present invention can preferably drive the flat panel display device 20 in a burst mode, in which the operating frequency is synchronized with an integral multiple, e.g. 3 or 4 of the frequency of the vertical synchronization signal. In the voltage mode, stable voltages are provided, so as to drive the lamp 202 at the ignition stage. In the current mode, stable currents are provided, so as to drive the lamp 202 with highest luminance. In the burst mode, luminance of the lamp 202 can be well-controlled by adjusting the resistor R, the capacitor C, and the gain G of the equivalent circuit of the program code 224. For example, when the raising and descending speeds of the output voltage Vo are high, dimming control of the lamp 202 is efficient. When the raising and descending speeds of the output voltage Vo are low, audible noises of the transformer can be eliminated.

Figure 13:
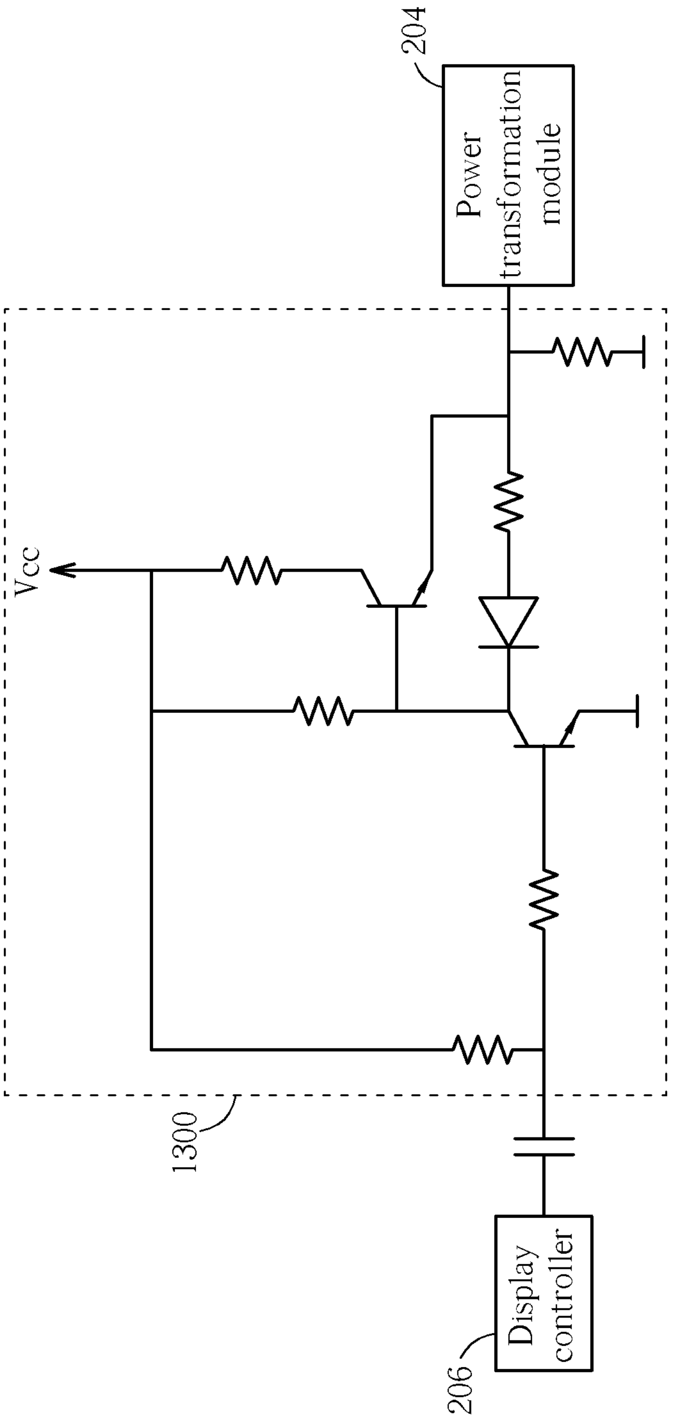
FIG. 13 illustrates a schematic diagram of a buffering circuit.

Regarding fail-safe protection, the present invention can reset the transformer 700 when a user adjusts the display panel through the adjustment module 218 or turns on and off AC power. In order to prevent the microcontroller 214 from dead lock, an output pin of the display controller 206 can be coupled to a buffering circuit, such as a buffering circuit 1300 shown in FIG. 13, through a de-coupling capacitor. Preferably, the control signals Q1 and Q2 are set to the high level when the microcontroller 214 is in an uncertain state or just started.

Figure 14:
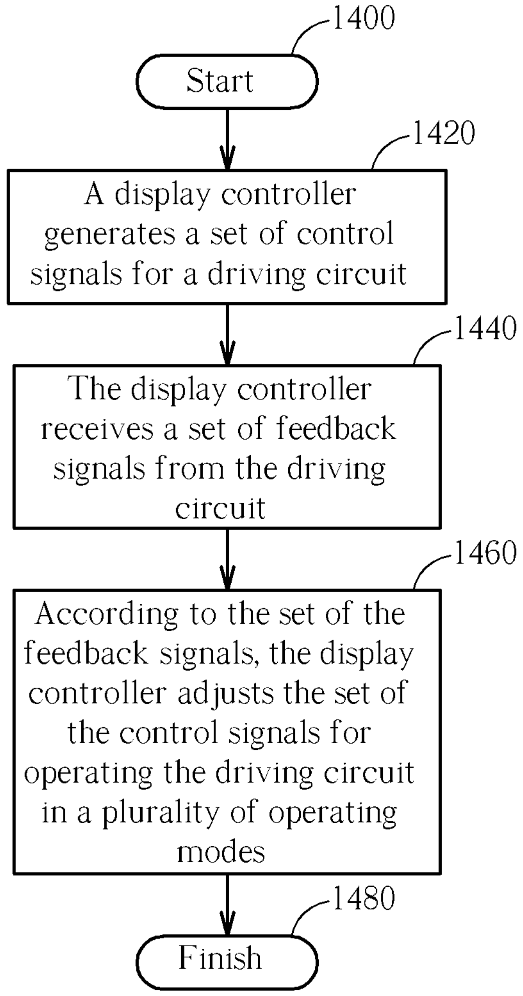
FIG. 14 illustrates a flowchart of a process for controlling a backlight driving circuit according to a preferred embodiment of the present invention.

FIG. 14 illustrates a flowchart of a method for controlling a backlight driving circuit in accordance with a preferred embodiment of the present invention. The driving circuit can be used for driving a CCFL. The method starts at step 1400 and finishes at step 1480. In a step 1420, a display controller generates a set of control signals for the driving circuit, preferably including the first transistor control signal Q1 and the second transistor control signal Q2 shown in FIG. 2, which are separated without overlapping. The set of the control signals are associated with an input horizontal synchronization signal or an output horizontal synchronization signal, preferably in an integral multiple of frequency or in an rising edge or falling edge alignment relationship, so as to remove visible interference on a display panel. In a step 1440, the display controller receives a set of feedback signals from the driving circuit, preferably including a current feedback signal I_FB, a voltage feedback signal V_FB, an input voltage signal Vin, and an open-circuit detection signal OPLZ.

In a step 1460, according to the set of the feedback signals, the display controller adjusts the set of the control signals for operating the driving circuit in a plurality of operation modes, preferably including a voltage mode, a current mode, and a burst mode. For example, when the CCFL is at an ignition stage, the step 1460 adjusts the set of the control signals to operate the driving circuit in the voltage mode with stable voltages. When the CCFL is at a normal operation stage, the step 1460 adjusts the set of the control signals to operate the driving circuit in the current mode with sufficient current. When the CCFL is at a dimming stage, the step 1460 adjusts the set of the control signals to operate the driving circuit in the burst mode, so as to adjust luminance of the CCFL by changing duty cycles of the control signals. For example, a digital PWM module generates the set of the control signals for the driving circuit, including the first transistor control signal Q1 and the second transistor control signal Q2. The display controller calculates an output voltage Vo(n+1) according to the set of the feedback signals, and the digital PWM module adjusts duty cycles of the set of the control signals according to the output voltage Vo(n+1).

In the voltage mode, signals V_FB(n) and Vin(n) are obtained by sampling the voltage feedback signal V_FB and the input voltage signal Vin, and the output voltage Vo(n+1) can be calculated as follows:

$$Io(n)=(V\_COM-V\_FB(n))\times G/Vin(n)$$

$$Vo(n+1)=Io(n)\times R+Vc(n)+Io(n)\times T/C$$

where R, C, and G represents parameters of a resistor, a capacitor, and a gain, V_COM represents a voltage comparison value, T represents time, Io(n) represents a sampled output current, and Vc(n) represents a crossing voltage between two ends of the capacitor with an initial value Vc(0)=0.

In the current mode, signals I_FB(n) and Vin(n) are obtained by sampling the current feedback signal I_FB and the input voltage signal Vin, and the output voltage Vo(n+1) can be calculated as follows:

$$Io(n)=(I\_COM-IFB(n))\times G/Vin(n)$$

$$Vo(n+1)=Io(n)\times R+Vc(n)+Io(n)\times T/C$$

wherein R, C, and G represents parameters of a resistor, a capacitor, and a gain, I_COM represents a reference current value, T represents time, Io(n) represents a sampled output current, and Vc(n) represents a crossing voltage of the capacitor with an initial value Vc(0)=0.

Figure 15:
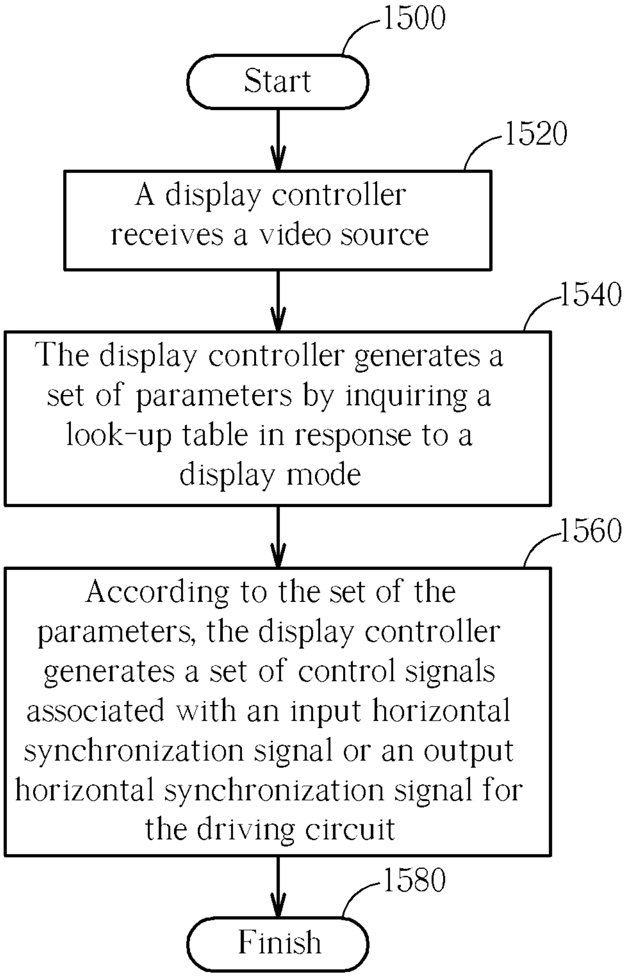
FIG. 15 illustrates a flowchart of a process for controlling a backlight driving circuit according to another embodiment of the present invention.

FIG. 15 illustrates a flowchart of a process for controlling a backlight driving circuit in accordance with an embodiment of the present invention. The driving circuit can be used for driving a CCFL. The process starts from a step 1500 and finishes at a step 1580. In a step 1520, a display controller receives a video source. In a step 1540, the display controller generates a set of parameters by inquiring a look-up table in response to a display mode, preferably including VGA, XGA, SXGA, WGA, WXGA, etc. The set of the parameters can be the associated parameters shown in FIG. 4. In a step 1560, according to the set of the parameters, the display controller generates a set of control signals associated with an input horizontal synchronization signal or an output horizontal synchronization signal for the backlight driving circuit.

In summary, the frequencies of the control signals Q1 and Q2 generated by the digital PWM module 210 associates with the display frequency of the display panel 200, so that a switching frequency of the lamp 202 is associated with the display frequency of the display panel 200. Thus, the visible interference on the display is effectively relieved, and display quality is improved. Preferably, the digital PWM module 210 is integrated into the display controller 206. Persons skilled in the art can realize that the digital PWM module 210 can drive the power transformation module 204 to light up not only the CCFL, but also other kinds of backlight sources, such as LED. Also, the resistor R, the capacitor C, and the gain G can be adjusted to reach any required performance of system manufacturers.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A flat panel display device, comprising:

a display panel;

a lamp for providing a backlight source for the display panel;

a power transformation module for providing a power source for the lamp;

a non-volatile storage unit for storing program code; and a display controller fabricated on a single silicon, comprising:

an image processing module for processing a video source and outputting a processed results to the display panel; and a digital pulse width modulation module for generating a pulse width modulation control signal to control the power transformation module according to an image synchronization signal received from the image processing module, the pulse width modulation control signal having a higher frequency than a frequency of the image synchronization signal, wherein the pulse width modulation control signal is adjustable for a plurality of display modes so as to associate a frequency of the pulse width modulation control signal with the image synchronization signal and synchronize the pulse width modulation control signal with the image synchronization signal in a current display mode selected from said plurality of display modes, wherein the digital pulse width modulation module comprises a pulse width modulator comprising:

a phase lock loop unit generating a phase lock signal;

a divider for dividing a frequency of the phase lock signal by a divisor; and a comparator generating a comparison result according to a comparison between a threshold value and a signal derived from the divider.

2. The flat panel display device of claim 1, wherein the display controller further comprises a microcontroller for performing the program code stored in the non-volatile storage unit.

3. The flat panel display device of claim 2, wherein the power transformation module comprises:

a transformer having a primary end and a secondary end coupled to the lamp; and a plurality of switch transistors coupled to the primary end and the digital pulse width modulation module, for switching current direction of the primary end according to a plurality of square waveforms outputted from the digital pulse width modulation module.

4. The flat panel display device of claim 2, wherein the digital pulse width modulation module adjusts duty cycles of the square waveforms for adjusting on and off time of the power transformation module to control a luminance of the lamp.

5. The flat panel display device of claim 4, wherein the digital pulse width modulation module comprises:

the pulse width modulator for generating a plurality of first square waveforms and adjusting duty cycles of the first square waveforms in response to a control signal from the microcontroller; and a control signal generation module for outputting a plurality of second square waveforms to the power transformation module during positive durations of the first square waveforms;

wherein each duty cycle of the second square waveforms is smaller than that of the first square waveforms.

6. The flat panel display device of claim 5, wherein the second square waveforms comprise a first control signal and a second control signal.

7. The flat panel display device of claim 6, wherein assertion duration of the first control signal is separated from that of assertion duration of the second control signal.

8. The flat panel display device of claim 5, wherein the pulse width modulator comprises:

a multiplexer for receiving an input horizontal synchronization signal and an output horizontal synchronization signal, to selectively output the input horizontal synchronization signal or the output horizontal synchronization signal;

a first divider coupled to the multiplexer, for generating a first output signal by dividing a frequency of an output from the multiplexer by a first divisor;

the phase lock loop unit for generating the phase lock signal;

a second divider for generating a second output signal by dividing a frequency of the phase lock signal by a second divisor;

a third divider for generating a third output signal by dividing a frequency of the second output signal by a third divisor;

a fourth divider for generating a fourth output signal by dividing the frequency of the second output signal by a fourth divisor; and the comparator for comparing the threshold value and the fourth output signal, and outputting corresponding square waveforms to the control signal generation module;

wherein the phase lock loop unit generates the phase lock signal according to the first output signal and the third output signal.

9. The flat panel display device of claim 5, wherein the digital pulse width modulation module further comprises a duty-cycle control module for adjusting duty cycles of the second square waveforms to prevent overlapping in the second square waveforms.

10. The flat panel display device of claim 1, wherein the program code stored in the non-volatile storage unit comprises controlling a frequency of signals outputted from the digital pulse width modulation module according to a horizontal synchronization signal and a vertical synchronization signal generated by the image processing module.

11. The flat panel display device of claim 1, further comprising:

a feedback circuit coupled to the lamp for outputting a sensing current of the lamp; and an analog to digital converter coupled between the feedback circuit and the display controller, for converting analog signals outputted from the feedback circuit into digital signals.

12. The flat panel display device of claim 11, wherein the microcontroller controls a frequency of signals outputted from the digital pulse width modulation module according to the digital signals outputted from the analog to digital converter.

13. The flat panel display device of claim 11, further comprises an adjustment module coupled to the analog to digital converter, for adjusting a plurality of display functions of the display controller, comprising:

a power source;

a resistor coupled to the power source;

a resistor sequence coupled to the resistor, comprising a plurality of resistors in series connection;

a plurality of switches each coupled between the resistor sequence and ground; and an output terminal between the resistor and the resistor sequence, for outputting voltage to the analog to digital converter.

14. A display controller of a flat panel display device, the display controller fabricated on a single silicon, the display controller comprising:

an image processing module for processing image data; and a digital pulse width modulation module coupled to the image processing module and an external application circuit, for generating a set of control signals for controlling the external application circuit according to an image synchronization signal received from the image processing module, the set of control signals having a higher frequency than a frequency of the image synchronization signal, wherein the set of control signals are adjustable for a plurality of display modes so as to associate a frequency of the control signals with the image synchronization signal and synchronize the set of control signals with the image synchronization signal in a current display mode selected from said plurality of display modes, wherein the digital pulse width modulation module comprises a pulse width modulator comprising:

a phase lock loop unit generating a phase lock signal;

a divider for dividing a frequency of the phase lock signal by a divisor; and a comparator generating a comparison result according to a comparison between a threshold value and a signal derived from the divider.

15. The display controller of claim 14, wherein the external application circuit is a power transformation module for providing an alternating-current voltage.

16. The display controller of claim 14, wherein the external application circuit is a power transformation module for driving a plurality of light emitting diodes.

17. The display controller of claim 14, wherein the external application circuit is a power transformation module for driving a lamp.

18. The display controller of claim 17, wherein the lamp is a cold cathode fluorescent lamp.

19. The display controller of claim 14, wherein the image synchronization signal is an input horizontal synchronization signal.

20. The display controller of claim 14, wherein the image synchronization signal is an output horizontal synchronization signal.

21. The display controller of claim 18, wherein the external application circuit controls on and off time of the cold cathode fluorescent lamp.

22. The display controller of claim 14, wherein the digital pulse width modulation module adjusts duty cycles of square waveforms for adjusting on and off time of the power transformation module for controlling luminance of the lamp.

23. The display controller of claim 14, wherein the digital pulse width modulation module comprises:

the pulse width modulator for generating a plurality of first square waveforms and adjusting duty cycles of the first square waveforms according to signals outputted from the image processing module; and a control signal generation module for outputting a plurality of second square waveforms to the external application circuit during positive durations of the first square waveforms;

wherein each duty cycle of the second square waveforms is smaller than that of the first square waveforms.

24. The display controller of claim 23, wherein the second square waveforms are formed by interlacing a first control signal and a second control signal, and assertion duration of the first control signal is separated from that of assertion duration of the second control signal.

25. The display controller of claim 23, wherein the pulse width modulator comprises:

a multiplexer for receiving an input horizontal synchronization signal and an output horizontal synchronization signal, to selectively output the input horizontal synchronization signal or the output horizontal synchronization signal;

a first divider coupled to the multiplexer, for generating a first output signal by dividing a frequency of an output from the multiplexer by a first divisor;

the phase lock loop unit for generating the phase lock signal;

a second divider for generating a second output signal by dividing a frequency of the phase lock signal by a second divisor;

a third divider for generating a third output signal by dividing a frequency of the second output signal by a third divisor;

a fourth divider for generating a fourth output signal by dividing the frequency of the second output signal by a fourth divisor; and the comparator for comparing the threshold value and the fourth output signal, to generate a comparison output to the control signal generation module;

wherein the phase lock loop unit generates the phase lock signal according to the first output signal and the third output signal.

26. The display controller of claim 23, wherein the digital pulse width modulation module further comprises a duty-cycle control module for adjusting duty cycles of the second square waveforms to prevent overlapping in the second square waveforms.

27. The display controller of claim 14, wherein the image synchronization signal is a horizontal synchronization signal and the set of control signals associate with a vertical synchronization signal.

28. The flat panel display device of claim 1, wherein the frequency of the pulse width modulation control signal is programmable and is proportional to the frequency of the image synchronization signal.

29. The flat panel display device of claim 1, wherein the frequency of the pulse width modulation control signal is an integral multiple of the frequency of the image synchronization signal.

30. The flat panel display device of claim 1, wherein the image synchronization signal includes a horizontal synchronization signal and a vertical horizontal synchronization signal, so that the frequency of the pulse width modulation control signal is associated with the frequency of the horizontal synchronization signal and the frequency of the vertical synchronization signal.

31. The display controller of claim 14, wherein the frequency of the control signals is programmable and is proportional to the frequency of the image synchronization signal.

32. The display controller of claim 14, wherein the frequency of the control signals is an integral multiple of the frequency of the image synchronization signal.

* * * * *